United States Patent
Kirk

[15] 3,674,726
[45] July 4, 1972

[54] PAPER COATING COMPOSITION COAGULATABLE BY HEATING

[72] Inventor: Mahlon Randall Kirk, South Windham, Maine

[73] Assignee: Scott Paper Company, Delaware County, Pa.

[22] Filed: Sept. 4, 1970

[21] Appl. No.: 69,951

Related U.S. Application Data

[63] Continuation-in-part of Ser. No. 634,909, May 1, 1967, abandoned.

[52] U.S. Cl..........................260/17.4 ST, 106/139, 106/141, 106/146, 117/155 UA, 117/156, 260/17 R, 260/17.4 BB, 260/29.6 MM, 260/29.6 MP, 260/29.6 MQ, 260/29.6 MN, 260/29.6 PT, 260/29.7 H, 260/29.7 P, 260/29.7 N, 260/815, 260/821, 106/213, 106/308

[51] Int. Cl......................................C08d 7/18, C08d 13/16

[58] Field of Search..................260/17 R, 17.4 ST, 17.4 BB, 260/29.6 MP, 29.6 MN, 29.6 PT, 29.7 P, 29.7 N, 29.7 PT, 815, 821, 29.6 MM; 106/139, 141, 146, 213, 308; 117/155 UA, 156

[56] References Cited

UNITED STATES PATENTS

| | | | |
|---|---|---|---|
| 2,537,114 | 1/1951 | Young et al. | 260/17.4 UX |
| 2,973,285 | 2/1961 | Berke et al. | 117/155 X |
| 3,001,957 | 9/1961 | Kray et al. | 260/17.4 |
| 3,281,267 | 10/1966 | Rice | 260/17.4 UX |
| 3,356,517 | 12/1967 | Nakajima et al. | 106/148 X |
| 3,377,192 | 4/1968 | Kirk et al. | 260/8 X |

Primary Examiner—William H. Short
Assistant Examiner—E. Nielsen
Attorney—John A. Weygandt, William J. Foley, John W. Kane, Jr. and M. L. Faigus

[57] ABSTRACT

A paper coating composition which is fluid at 25° C. but coagulates or flocculates when heated to an elevated temperature comprising an aqueous slurry of a conventional mineral pigment and adhesive binder which slurry contains an ionic dispersant for the pigment, the efficiency of which does not change appreciably with heating, and a counteracting agent for the dispersant that is relatively insoluble at 25°C. but solubilizes at an elevated temperature in the range of 35° to 100° C. sufficiently to counteract the dispersant and cause the composition to coagulate or flocculate.

7 Claims, No Drawings

PAPER COATING COMPOSITION COAGULATABLE BY HEATING

RELATED APPLICATION

This application is a continuation-in-part of copending application Ser. No. 634,909, filed May 1, 1967 now abandoned.

BACKGROUND OF THE INVENTION

1. Field of the Invention

This invention relates to an aqueous paper-coating composition which turns to a non-flowable gel when heated, and more particularly to a composition comprising a mineral pigment, an adhesive binder and an ionic dispersant for the pigment.

2. Description of the Prior Art

U. S. Pat. No. 3,356,517, "Heat Coagulatable Paper Coating Composition," issued Dec. 5, 1967 in the name of Nakajima et al and U. S. Pat. No. 3,377,192, "Process for Coating Paper with a Heat Flocculatable Latex-Based Composition and the Resultant Product," issued Apr. 9, 1968 in the name of Kirk et al, both assigned to the assignee of the present application, disclose a paper coating composition that can be gelled or flocculated to a non-flowable state by heating to a temperature in the range of 35° to 100° C. This heat coagulation is secured by controlling the action of the dispersing agent acting on the pigment such that the stability of the composition is just beyond borderline stability at 25° C, i.e., the pigment is marginally dispersed. When the composition is heated the dispersing agent desorbs from the pigment sufficiently to permit the desired flocculation to occur. When a layer of the coating composition is applied to a paper web and heated to an elevated temperature, it coagulates rapidly and sets while wet to a state that is amenable to casting, i.e., drying the coated paper while pressing the coated surface on a polished, heated surface such as metal and then separating the paper from the heated surface after the period required for drying. A coated paper is obtained which has a high degree of smoothness and gloss. While coating and casting is the preferred method of manufacturing coated paper employing these coating compositions, other methods of imparting a smooth surface can be used.

In preparing a heat-flocculatable coating slurry in the manner of said patents, the total level of all dispersants in the system must be such that the pigment is not suspended too efficiently. Usually some stirring or agitation must be used to keep the slurry in a fluid condition at its temperature of preparation. It is thus apparent how these coating compositions of borderline stability can present problems in storage, transport and application during hot weather. In addition, flocculation caused by desorption of the dispersing agent tends to be reversible, i.e., the original fluidity can return upon cooling.

SUMMARY OF THE INVENTION

It has now been found that a heat coagulatable mineral pigment-containing paper coating composition can be made with an ionic dispersant the efficiency of which, with regard to the mineral pigment, does not materially change with temperature, by incorporating in the composition a counteracting agent for the dispersant that is relatively insoluble at the application temperature of the coating, about 25° C., but becomes sufficiently soluble when the composition is heated to counteract the effect of the dispersant and flocculate the mineral pigment. In this sense the effect of the ionic dispersant, in initially dispersing the pigment, may be considered "primary." The effect of the counteracting agent in negating the influence of the dispersant may be considered "secondary" or latent.

In a preferred embodiment, the counteracting agent is substantially insoluble and non-ionized at 25° C. but dissolves at higher temperatures and releases ions having a charge opposite the charge of the dispersant. The ions of the counteracting agent effectively neutralize the dispersing agent, thereby preventing the dispersing agent from acting on the pigment whereupon the composition gels. The dispersant can be anionic and the counteracting agent can be a cationic material, which as it solubilizes with heating, breaks the anionic dispersion. Alternatively, the charge relation is reversed and the primary dispersant is a cationic one and the counteracting agent is anionic. It will be appreciated that the coagulation that is obtained by the present invention is irreversible, which is generally not the case with the compositions of the earlier described patents.

In brief compass, the heat coagulatable paper coating composition of this invention comprises an aqueous slurry having a total solids content of at least 30 weight percent and containing a paper-coating-grade mineral pigment, an adhesive binder, an ionic dispersant for said pigment which is present in an amount sufficient to stably disperse the pigment at an elevated temperature in the range of 35° to 100° C. in the absence of any counteracting agent and the efficiency of which with regard to the pigment does not change appreciably with temperature, and a counteracting agent which is relatively insoluble at 25° C. but solubilizes at the elevated temperature and counteracts the pigment dispersing action of the dispersing agent thereby causing said composition to set irreversibly to a non-flowable state at the elevated temperature.

In contradistinction to the heat coagulatable compositions of the above-mentioned patents, the present coating compositions are thoroughly dispersed at ambient temperature when prepared since the counteracting agent does not commence its action until the time when the compositions are heated. While the previous coating compositions tend to go through a thickening stage when being prepared, the present coatings are relatively stable throughout the whole mixing cycle. If desired, the counteracting agent or "de-stabilizer" can be withheld from the coating color and added separately just before use, which eliminates the danger of accidental, premature gelling of the compositions during storage.

DETAILED DESCRIPTION

Since the vast majority of commercially-employed coating compositions comprise an anionic dispersant, a cationic counteracting agent is regarded as preferred in this invention. While a cationic dispersant in combination with an anionic counteracting agent is equally operable, these types of components are not readily available. In another modification, an acid which is relatively insoluble cold but solubilizes with heating can be used to counteract an anionic dispersant. Likewise, a base can be used to counteract a cationic dispersant. An acid or base acts in a somewhat different counteracting manner from an oppositely charged agent. It tends to suppress the ionization of the ionic dispersant and thus reduces the effectiveness of the dispersant.

Table I presents a number of ionic dispersants of the anionic type which are useful in the present invention. Table II describes several suitable cationic counteracting agents. The cationically substituted starches, when used in the uncooked stage as obtained from the manufacturer, function as cationic counteracting agents. The same starches, if solubilized by cooking, i.e., heating in water, for example at 180° – 200° F. for 30 minutes, serve as cationic dispersants. Other satisfactory cationic dispersants include a quaternary ammonium chloride, Katapone VV—328 manufactured by General Aniline and Film and polyethyleneimine manufactured by Dow Chemical Company. An appropriate anionic counteracting agent is carboxymethylated starch, e.g., Astrogum 21 manufactured by Penick and Ford Company.

TABLE I

| Anionic Dispersants | | |
| --- | --- | --- |
| Chemical Nature | Brand Name | Manufacturer |
| acetylenic glycol | Surfynol | Airco Chem. Co. |

| | | |
|---|---|---|
| sodium hexameta phosphate (zinc modified) | Calgon T 104A | Calgon Corp. |
| potassium salt of alkyl naphthalene sulfonic acid | Daxad 11 | W. R. Grace |
| sodium salt, sulfonated naphthalene formaldehyde | Lomar D | Nopco |
| polymeric dispersant | Nocosant L | Nopco |
| sodium tetraphosphate | Quadrofos | Rumford Chem. Co. |
| ammonium salt of an amido polyphosphate | Victamide | Victor Chemical |
| sodium acid pyrophosphate | | Olin Mathieson |
| polyoxyethylene, polyoxy-propylene polymer | Pluronic L-61 | Wyandotte |
| sodium lauryl sulfate | Duponol ME | E. I. duPont |
| sodium salt of polymeric carboxylic acid | Tamol 850 | Rohm & Haas |
| organic phosphate | Dequest 2000 | Monsanto |
| organic polyphosphoric ester acid anhydride | Strodex PK-90 | Dexter |
| tetra sodium pyrophosphate | | Monsanto |

TABLE II

Cationic Counteracting Agents

| Chemical Nature | Brand Name | Manufacturer |
|---|---|---|
| cationically substituted starch | Cato 4 | Nat'l. Starch & Chem. Co. |
| cationically substituted starch | Cato 8 | Nat'l. Starch & Chem. Co. |
| cationically substituted starch | Cato 16 | Nat'l. Starch & Chem. Co. |
| aluminum citrate | | Amend Drug & Chem. |
| aluminum tartrate | | Amend Drug & Chem. |
| ferric phosphate | | Merck |
| m-toluic acid | | Eastman Organic Chemicals |
| benzoic acid | | Monsanto |
| salicylic acid | | Matheson, Coleman, & Bell |

TABLE III

Solubilities of Counteracting Agents

| Agent | Solubility at low temp. gm/gm water | Low temp. °F | Solubility at high temp. gm/gm water | High temp. °F |
|---|---|---|---|---|
| cationically substituted starch (Cato 4 and 8) | $6.7 \times 10^{-4}$ | 83 | $>1.3 \times 10^{-1}$ | 203–212 |
| cationically substituted starch (Cato 16) | $2.7 \times 10^{-3}$ | 80 | $>1.2 \times 10^{-1}$ | 203–212 |
| carboxymethylated starch (Astrogum 21) | $3.0 \times 10^{-4}$ | 83 | $>1.05 \times 10^{-1}$ | 203–212 |
| aluminum citrate | $3.8 \times 10^{-3}$ | 84 | $2.0 \times 10^{-1}$ | 203–212 |
| aluminum tartrate | $2.1 \times 10^{-2}$ | 82 | $>1.9 \times 10^{-1}$ | 203–212 |
| ferric phosphate | $6.2 \times 10^{-4}$ | 82 | $1.6 \times 10^{-2}$ | 203–212 |
| m-toluic acid | $8.5 \times 10^{-4}$ | 68 | $1.67 \times 10^{-2}$ | 212 |
| benzoic acid | $2.9 \times 10^{-3}$ | 68 | $6.8 \times 10^{-2}$ | 203 |
| salicylic acid | $2.2 \times 10^{-3}$ | 68 | $6.67 \times 10^{-2}$ | 212 |

From the solubility data presented in Table III above, the following generalization concerning the preferred counteracting agents may be drawn: At a temperature of 85° F (30° C), the agent possesses a solubility of less than $2.5 \times 10^{-2}$ grams per gram of water and at the boiling point of water (100° C) possesses a solubility at least ten-fold greater than that which it possessed at 85° F (30° C).

Table IV contains representative examples of coating compositions illustrative of the present invention. None of these compositions would coagulate upon heating in the absence of the counteracting agent. In the Table, the number which precedes each component expresses the parts by weight thereof. Explanatory comments concerning components not hereinbefore described are indicated by the parenthetical numerals.

TABLE IV.—COATING FORMULAS

| Ctg. | Pigment | Dispersant | Natural binder | Synthetic latex binder | Counteracting agent | Additive | Percent solids |
|---|---|---|---|---|---|---|---|
| A | 100 Lustra Clay [1] | 0.2 Victamide | None | 20 Dow 620 [13] latex. | 12 dry, uncooked Cato 4. | None | 59.5 |
| B | 100 Ultrawite 90 [2] | 0.2 Calgon T | do | do | 12 dry, uncooked Cato 16. | do | 59.4 |
| C | 100 OX-1 [3] organophylic clay. | 2 Duponol ME | do | do | 5 ferric phosphate. | ½ tributyl phosphate [16]. | 59.4 |
| D | 50 Albagloss [4]; 50 Camelwite [5]. | 0.25 Quadrofos | do | do | 7 aluminum citrate. | do | 60.2 |
| E | 50 Lusta Clay; 25 Camelwite; 25 Hydral 705 [6]. | 0.3 Nopcosant L | 10 pearl (unconverted) starch. | 10 Dow SD501 [13] latex. | 6 aluminum citrate. | None | 54.9 |
| F | 50 Ultrawite 90; 50 Albagloss. | 0.25 Daxad 11 | None | 20 Resyn 1105 [14] | 2½ m-toluic acid | 1 NH4OH [17] | 53.9 |
| G | 50 Camelwite; 50 Hydral 705. | 1 Tamol 850 | do | 20 Rhoplex B-15 | 10 Cato 4 (uncooked, dry). | None | 54.1 |
| H | 100 Ultrawite 90; Clay. | 1 Surfynol 104A | do | 20 Resyn 1105 | 12 (dry uncooked) Cato 16. | do | 53.5 |
| I | 50 Lustra Clay; 50 TiO2 [7] | 0.1 sodium acid pyrophosphate. | do | 20 Rhoplex B-15 | 3 benzoic acid | do | 49.0 |
| J | 50 Ultrawite 90; 15 Camelwite; 15 TiO2; 20 Hydral 705. | 1 Lomar D | 10 Penford Gum 280. | 10 Resyn 1105 | 7 aluminum citrate. | do | 49.2 |
| K | 50 Lustra; 50 Ultrawite 90 | 1 Pluronic L-61 | 10 casein | 10 Dow 620 latex | 5 aluminum tartrate. | do | 48.7 |
| L | 100 Ultrawite 90 | 1 Dequest 2000 | 10 medium viscosity soy protein. | 10 Resyn 1105 | 1½ aluminum tartrate. | do | 48.4 |
| M | 50 Ultrawite 90; 50 Albagloss. | 1 Strodex PK-90 | 10 pearl starch | do | 5 aluminum tartrate. | do | 44.4 |
| N | 100 Comet Clay [8] | 10 Cooked Cato 4 | Primary dispersant serves as binder. | 10 Dow CX7020 [13] latex. | 5 Astrogum 21 | do | 45.8 |
| O | 50 Comet Clay; 50 Camelwite. | 10 Katapone VV-328. | 10 Catokote 78-1616 [11]. | do | do | 1 tributyl phosphate. | 45.6 |
| P | 50 Lustra Clay; 40 Ultrawite 90; 10 Hydral 705. | 0.2 tetrasodium pyrophosphate | None | 20 Dow SD501 latex. | 5 salicylic acid | do | 45.6 |
| Q | 100 A-1 Clay [9] | 0.15 tetrasodium pyrophosphate | do | 13 Dow QX2249 [13] latex. | 12 Cato 8 (dry, uncookee). | do | 48 |
| R | 100 Comet Clay | 8 polyethyleneimine. | 8 Stadex 105 [12] | 8 Dow 620 latex | 5 Astrogum 21 | ¼ tributyl phosphate. | 45 |
| S | 100 A-1 Clay | Predispersed | 12 Stadex 105 | 13 Dow QX2249 latex. | 4 aluminum citrate. | do | 48 |
| T | do | do | 8 Stadex 105 | 16 Dow 620 latex | 2½ m-toluic acid | None | 45 |
| U | do | do | do | do | 5 zinc ammine complex. | do | 44 |

[1] Lustra clay is a predispersed #1 domestic clay from Freeport Kaolin Company.
[2] Ultrawite 90 is a froth floated, predispersed domestic clay from Englehard Minerals & Chemicals.
[3] OX-1 is an organophilic clay produced by Freeport Kaolin Company.
[4] Albagloss is a precipitated calcium carbonate from Charles Pfizer & Company.

(1) Lustra clay is a predispersed No. 1 domestic clay from Freeport Kaolin Company.
(2) Ultrawite 90 is a froth flotated, predispersed domestic clay from Englehard Minerals & Chemicals.
(3) OX-1 is an organophilic clay produced by Freeport Kaolin Company.
(4) Albagloss is a precipitated calcium carbonate from Charles Pfizer & Company.
(5) Camelwite is a ground calcium carbonate from Harry T. Campbell and Sons.
(6) Hydral 705 is a hydrated alumina from Aluminum Company of America.
(7) Anatase $TiO_2$—AMWD from Titanium Corporation.
(8) Comet is a non-predispersed clay from Moore & Munger of England.
(9) A-1 Clay is a clay predispersed by 0.4 parts tetrasodium pyrophosphate from Moore & Munger.
(10) Penford Gum 280 is an ethylated starch from Penick & Ford.
(11) Catokote 78-1616 is a cationic starch from National Starch & Chemical Company.
(12) Stadex 105 is a dextrinated starch from A. E. Staley Company.
(13) 620, SD501, CX7020 and QX2249 are styrene-butadiene latexes (with or without added carboxyls) from Dow Chemical Company.
(14) Resyn 1105 is a carboxyl-modified vinyl acetate latex from National Starch and Chemical Company.
(15) Rhoplex B-15 is an acrylic latex from Rohm & Haas Company.
(16) The tributyl phosphate is employed as a added
(17) The $NH_4OH$ is added for pH control.

The coating compositions in Table IV represent a wide variety in pigments, binders, and percent solids (viscosity). This variety is further dramatized in Table V, wherein, in addition to their coagulation characteristics, the pH, viscosity, and water retention of coatings A-P are described. Viscosity was measured with a Brookfield Model RVF-100 viscometer using the No. 5 spindle. Water retention was determined by measuring the electrical conductivity through a sheet of water leaf paper pressed against the coating. As the water migrates from the coating into the sheet of paper, the conductivity increases. The values given represent the time required for the conductivity to reach 0.5 milliamp.

TABLE V

Properties of the Coatings

| Ctg. | pH | Brookfield Viscosity (Centipoise) | Water Retention Seconds | Coagulation Upon Heating (°F) |
|---|---|---|---|---|
| A | 6.25 | 100 | 4-5 | starts at 150, firm at 170 |
| B | 5.25 | 180 | 5-6 | starts at 150, firm at 170 |
| C | 5.05 | 280 | 8-9 | med.-firm gel at 190-200 |
| D | 6.60 | 250 | 2-3 | starts at 170, firm at 185 |
| E | 6.70 | 640 | 11-13 | starts at 170, med.-firm at 190 |
| F | 8.15 | 2760 | 2-3 | starts at 140, med.-firm at 160 |
| G | 7.20 | 230 | 3-4 | starts at 150, med at 180 |
| H | 5.25 | 200 | 2-3 | starts at 150, firm at 170 |
| I | 5.05 | 4080 | 2-3 | starts at 110, medium at 140 |
| J | 6.65 | 500 | 23-25 | soft gel at 170-190 |
| K | 6.60 | 1980 | 17-19 | starts at 150-med.-firm at 170 |
| L | 5.65 | 3220 | 2-3 | soft gel at 170, medium-firm at 190 |
| M | 6.75 | 170 | 3-4 | soft gel at 140-180 |
| N | 6.30 | 2600 | 13 | starts at 140, firm at 180 |
| O | 7.45 | 2400 | 9-13 | soft gel starting at 150 |
| P | 4.10 | 1940 | <1 | soft gel starting at 150 |

The properties of coatings R-U are more fully illustrated in the following specific examples 1-5 respectively.

EXAMPLE 1

A coating formulation in which the dispersant is anionic and the counteracting agent is cationic comprises:

| Component | Parts by Dry Weight |
|---|---|
| A-1 Clay[1] | 100 |
| Cationic Starch (Cato 8)[3] | 12 |
| Tetrasodium Pyrophosphate (TSPP) | 0.15 |
| Potassium Oleate | 1 |
| Carboxylated styrene-butadiene latex (QX 2249)[2] | 13 |
| Tri-butyl phosphate | 1 |
| Water in an amount sufficient to provide a coating having 58 percent solids | |

(1) The A-1 Clay is predispersed with 0.4% TSPP
(2) Dow Chemical Company
(3) National Starch & Chemical Company This coating is fluid at 25° C. but when heated to about 150°-160° F. in a beaker it turns to a soft gel, which gets progressively thicker as the temperature increases. The Cato-8 is a cationic starch that is relatively insoluble cold. When it solubilizes with heating, it counteracts the effect of the anionic dispersant, the TSPP, causing the coating to agglomerate. The potassium oleate is used as a release agent and the tributyl phosphate as a defoamer.

This coating composition is applied to a machine coated body stock at 15 pounds per ream with an air knife coater. The wet coating is immediately heated to 200° F. by a radiant convection dryer and then pressed against a rotating polished chrome plated drum by means of a resilient rubber-covered backing roll. The drum temperature is 250° F. and its velocity is 210 feet per minute. The coated sheet that is obtained has a high degree of smoothness and a mirror-like gloss.

EXAMPLE 2

A coating composition in which the dispersant is cationic and the counteracting agent is anionic comprises:

| Component | Parts by Dry Weight |
|---|---|
| English Clay[1] | 100 |
| Polyethyleneimine[2] | 8 |
| Dextrinated starch[3] | 8 |
| Butadiene-styrene latex[4] | 8 |
| Tributyl phosphate | 0.25 |
| Carboxymethylated starch[5] | 5 |
| Water sufficient for 45% solids | |

(1) Moore & Munger's Comet Clay
(2) Dow Chemical Company
(3) A. E. Staley's Stadex 105
(4) Dow Chemicals' 620 Latex
(5) Penick & Ford's Astrogum 21

In the absence of the Astrogum, the coating will not coagulate at 200° F. With the Astrogum it will coagulate starting at 150° F. It has a medium to firm consistency at 200° F. If 2½ additional parts of Astrogum are added, the composition will flocculate in a beaker to a firm state at 180° F.

The Astrogum is essentially an inert pigment in the composition at ambient temperatures. It commences to dissolve with heating and becomes an anionic dispersant which counters the cationic polyethyleneimine and breaks the pigment slurry. A cooked cationic starch or quaternary ammonium compound can be substituted for the imine, and any anionic dispersant that is relatively insoluble cold and soluble hot can be substituted for the Astrogum.

EXAMPLE 3

The following is a coating composition containing an anionic dispersant that is destabilized by a polyvalent metal salt that is relatively insoluble cold but becomes soluble with heating:

| Component | Parts by Dry Weight |
|---|---|
| A-1 Clay (with 0.4 parts TSPP) | 100 |
| Stadex 105 | 12 |
| Potassium oleate | 0.5 |
| QX-2249 latex | 13 |
| Tri-butyl phosphate | 1 |
| Aluminum citrate (finely divided) | 4 |
| Water sufficient for 48% solids | |

Without the citrate, this coating will not gel at 200° F. With the citrate, it starts to gel at 180° F., is a medium gel at 185° F. and a medium-firm gel at 190° F.

Other anionic dispersants which may be employed in place of the tri-butyl phosphite are sodium hexametaphosphate, sodium tripolyphosphate, and carboxymethyl cellulose. Aluminum tartrate and cesium alum may be substituted for aluminum citrate.

EXAMPLE 4

In the following, an acid which is relatively insoluble cold but solubilizes with heating is used to counteract an anionic dispersant:

| Component | Parts by Dry Weight |
|---|---|
| A-1 Clay (with TSPP) | 100 |
| Stadex 105 | 8 |
| Dow 620 Latex | 16 |
| Meta-toluic acid | 2.5 |
| Water sufficient for 45% solids | |

The M-toluic acid dissolves with heating, lowering the pH and adding electrolyte to the system, both of which contribute to the agglomeration of the slurry. A soft gel is obtained at 180° F.

EXAMPLE 5

A metal chelate which releases polyvalent metal ions and evolves ammonia with heating can be used to counteract an anionic dispersant:

| Component | Parts by Dry Weight |
|---|---|
| A-1 Clay (with TSPP) | 100 |
| Stadex 105 | 8 |
| Dow 620 Latex | 16 |
| Zinc-amine complex[1] | 5 |
| Water sufficient for 44% solids | |

(1) 10 parts zinc chloride, 100 parts water and 30 parts concentrated NH$_4$OH.

The coating will not gel without the zinc complex but with it, it becomes a firm gel at 160° F.

Thus it may be seen that the present invention provides an aqueous paper-coating composition which is stably dispersed at room temperature, but upon heating sets irreversibly to a non-flowable state. While the invention has been described in the specific Examples with respect to cast-coating compositions, as may be seen from the variety of the compositions presented in Table IV, the coating composition of the present invention may be adapted to various kinds of coating methods.

In particular, a heat-coagulatable composition of the present invention may be advantageously employed in "gloss calendering" wherein the surface of a freshly coated sheet of paper is pressed against a heated finishing drum while supported by a resilient backing roll. If the coating is flocculated by heating just prior to drum finishing, it is fixed to the paper surface, increased in its cohesion strength and is therefore easily separable from the heated metal surface. More generally, a heat-gellable coating composition is useful whenever it is desired to have the coating set to a coagulated, non-flowable state, for example, so that the coating is not easily injured by contact with other materials or easily dissolved by contact with water.

It is to be understood that the above-described embodiments of the invention are merely illustrative of its principles. Various other modifications may be devised by those skilled in the art to adapt the coating composition to a particular paper-coating method without departing from the spirit and scope of the invention as defined by the appended claims.

What is claimed is:

1. An aqueous paper-coating composition comprising a paper-coating-grade mineral pigment, an adhesive binder and an ionic dispersant for the pigment wherein the dispersant is present in an amount sufficient to stably disperse said pigment at an elevated temperature in the range of 35° to 100° C. and the efficiency of which with regard to said pigment does not change appreciably with temperature, and further comprising a counteracting agent which is relatively insoluble at 25° C. but solubilizes and ionizes at said elevated temperature and counteracts the pigment-dispersing action of the dispersant, thereby causing the composition to coagulate.

2. The composition of claim 1 wherein said dispersant is anionic and said counteracting agent is cationic.

3. The composition of claim 1 wherein said dispersant is anionic and said counteracting agent is an acid.

4. The composition of claim 1 wherein said dispersant is cationic and said counteracting agent is anionic.

5. An improved heat coagulatable paper coating composition comprising an aqueous slurry having a total solids content of at least 30 weight percent and containing a paper-coating-grade mineral pigment, an adhesive binder, an ionic dispersant for said pigment selected from the group consisting of tetrasodium pyrophosphate, sodium hexametaphosphate, sodium tripolyphosphate, carboxymethylcellulose and polyethyleneimine and a counteracting agent that is relatively insoluble in water at 25° C. but solubilized at a temperature of from 35° to 100° C. selected from the group consisting of cationic starch, carboxymethylated starch, aluminum citrate, aluminum tartrate, cesium alum and metatoluic acid; said ionic dispersant being employed in an amount sufficient to stably disperse said pigment at a temperature of from 35° to 100° C. in the absence of any counteracting agent and said counteracting agent being employed in an amount sufficient to counteract the charge of the dispersant.

6. The improved heat coagulatable paper coating composition claimed in claim 5 wherein the ionic dispersant is employed in an amount sufficient to disperse the pigment to the same degree as 0.4 parts by weight of tetrasodiumpyrophosphate per 100 parts by weight of undispersed coating clay.

7. The composition according to claim 1 wherein the counteracting agent possesses a solubility of less than $2.5 \times 10^{-2}$ grams per gram of water at 30° C. and a solubility at least tenfold greater at 100° C.

* * * * *